J. R. MERRIHEW.
Coffee Scourer and Cleaner.

No. 228,094.                    Patented May 25, 1880.

Witnesses.
F. H. Pierson
Geo. W. Pierce.

Inventor.
J. R. Merrihew
by Wright & Brown
Attys.

UNITED STATES PATENT OFFICE.

JOSEPH R. MERRIHEW, OF LYNN, MASSACHUSETTS.

COFFEE SCOURER AND CLEANER.

SPECIFICATION forming part of Letters Patent No. 228,094, dated May 25, 1880.

Application filed September 17, 1879.

*To all whom it may concern:*

Be it known that I, JOSEPH R. MERRIHEW, of Lynn, in the county of Essex and State of Massachusetts, have invented certain Improvements in Machines for Scouring and Cleaning Coffee, of which the following is a specification.

This invention relates to removing the thin inner skin known as the "silver-skin" that adheres to all varieties of coffee-berry after hulling.

In practicing my invention I make use of a stationary casing or cylinder of perforated sheet-brass and a movable stirring or agitating device composed of solid iron arms secured to a shaft and located in said casing, and adapted to move the berries therein over the inner surface of the casing, whereby the berries are scoured and cleaned, as I will now proceed to describe.

Figure 1:
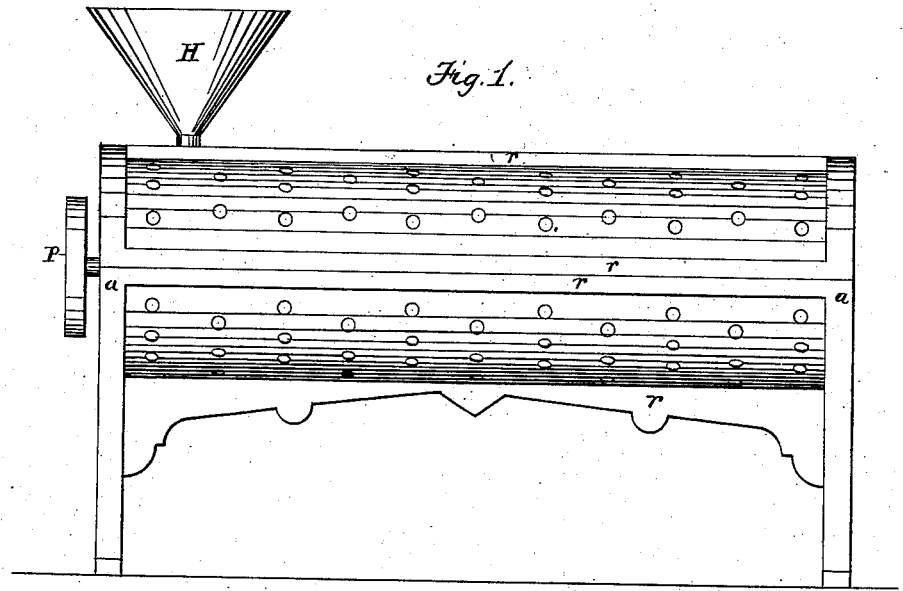
Figure 2:
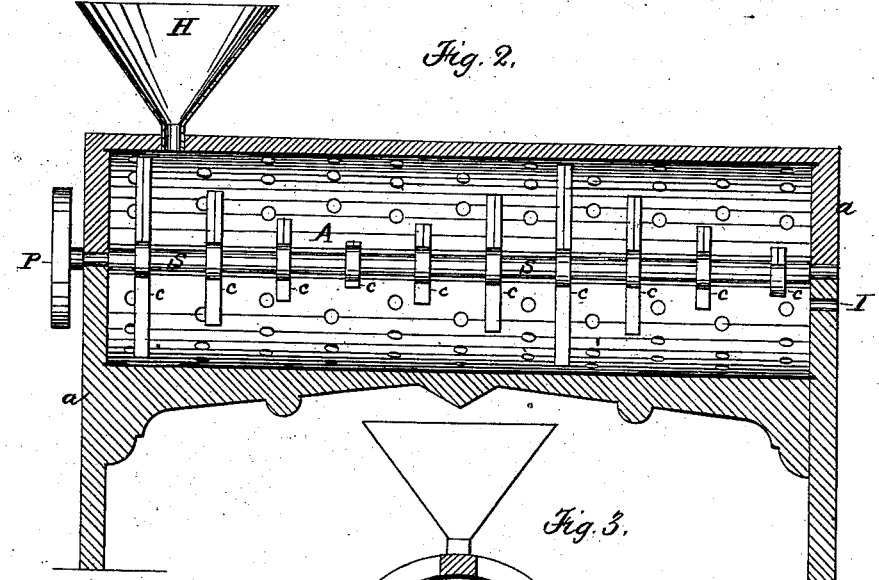
Figure 3:
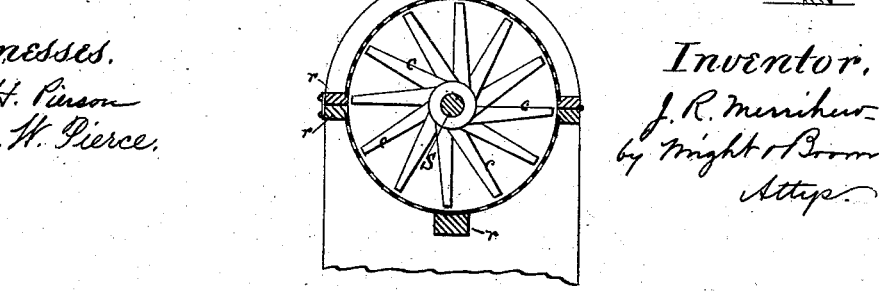

Of the accompanying drawings, forming a part of this specification, Figure 1 represents a side elevation of my improved machine. Fig. 2 represents a longitudinal vertical section, and Fig. 3 represents a transverse section.

Similar letters of reference indicate like parts in all the figures.

In the drawings, A represents a casing of perforated sheet metal. Said casing is preferably cylindrical in form, and is composed of brass. The perforations are punched or cut in the metal in such manner that their margins form sharp well-defined angles in connection with the inner surface of the cylinder. Said perforations are preferably arranged in close proximity to each other, and each is less in diameter than the smaller cross-section of a coffee-berry.

The inner surface of the cylinder is smooth and unobstructed, and such cylinder is located in a stout frame-work composed of longitudinal bars $r$ and ends or heads $a\ a$, to which said bars are rigidly connected. The ends or heads of the frame are preferably of wood, and are suitably attached to the ends of the casing. The frame-work is located on suitable legs or supports.

S represents a shaft journaled in bearings formed in the heads of the casing and provided with a suitable pulley, P. Upon the shaft S are arranged a series of arms or blades, $c$, adapted to agitate or stir coffee-berries in the casing when the shaft is rotated. Said blades are beveled on one side, and thus adapted to gradually move the coffee-berries toward one end of the casing.

H represents a hopper or funnel in the top of the casing, near one end thereof, for the introduction of the coffee-berries.

I represents an opening in one of the heads of the casing at the end opposite the inlet H. Said opening is preferably located above the lowest point in the interior of the casing, and is provided with a suitable movable cover, whereby it may be closed.

When the coffee is introduced into the casing through the inlet and the shaft is rotated the arms keep the berries in constant motion over the inner surface of the cylinder. The sharp angular edges of the perforations act to remove all the silver-skin that adheres to the berries after the removal of the hull, thoroughly scouring the berries and leaving them in a clean condition. The matter thus removed falls through the perforations, and is thus separated from the berries, the perforated casing acting as a sieve.

While the described operation is being performed the coffee is being gradually propelled by the rotating arms or blades to the end of the casing containing the discharge-opening and forced out through said opening by the propelling force of the blades. The discharge-opening is closed when the berries are first introduced into the casing, and is kept closed until a considerable quantity is accumulated at the end containing the discharge-opening, when said opening is unobstructed and the berries are allowed to escape. The quantity of berries admitted to the casing through the hopper is then made equal to the quantity discharged, so that there will be a free and uniform passage of berries through the casing without choking or crowding.

The arrangement of the hopper at one end and the discharge-opening at the opposite end of the casing and the adaptation of the blades to propel the berries from one end of the casing to the other insure the passage of each berry from one end of the casing to the other.

The length of the casing should be such as to afford a sufficient area of perforated surface to insure the scouring and cleaning of all the berries by one passage through the casing. I have found that about six feet is a sufficient length.

The stirrers or arms c are made of solid iron and quite heavy, for in order to effectually remove the closely-adhering silver-skin the rubbing must be hard and performed slowly, one hundred revolutions a minute being a fair maximum speed. Another essential to successfully removing this silver-skin is the use of a hard brass perforated cylinder, the edges of the perforations being sharp and without burrs. Iron will not do for the cylinder, as it will bruise and discolor the coffee, and brass alone permits the scouring of the berries so as to present them in good marketable color and shape.

I claim as my invention—

The within-described improved apparatus for removing the silver-skin from coffee-berries, consisting of a perforated sheet-brass cylinder of smooth interior, the edges of the perforations being sharp angles, and a number of heavy iron stirrers or arms having one edge beveled, and arranged upon a shaft to rotate slowly, substantially as shown, and as and for the purpose specified.

In testimony whereof I have signed my name to this specification, in the presence of two subscribing witnesses, this 30th day of August, 1879.

JOSEPH R. MERRIHEW.

Witnesses:
  C. F. BROWN,
  GEO. W. PIERCE.